Jan. 31, 1956   F. N. ROTHACKER   2,732,717
GRAVITY METER
Filed Oct. 29, 1949
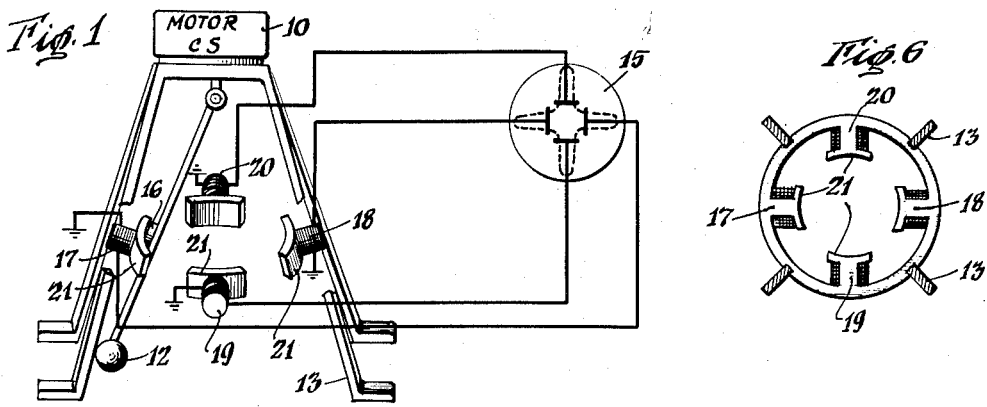
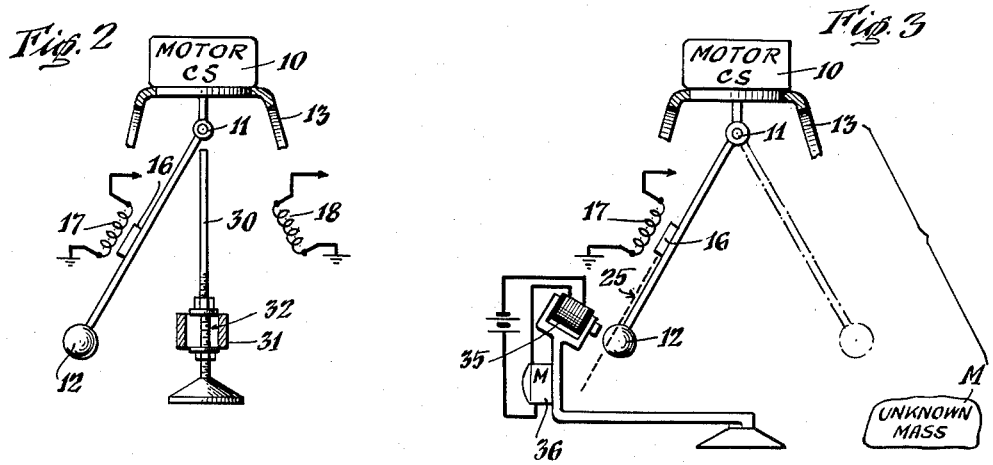
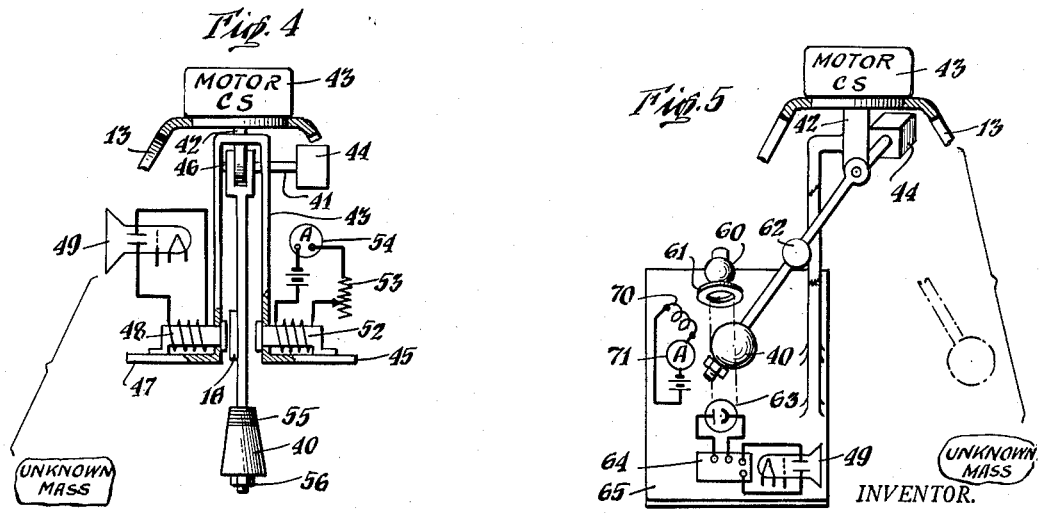
INVENTOR.
F. Neill Rothacker
BY
Bohleber, Fassett + Montstream
ATTORNEYS

United States Patent Office 2,732,717
Patented Jan. 31, 1956

2,732,717
GRAVITY METER
Francis Neill Rothacker, Rye, N. Y.

Application October 29, 1949, Serial No. 124,306

10 Claims. (Cl. 73—382)

The invention relates to a gravity meter by means of which variations in the force of gravity in amount and as to its direction may be determined. The meter utilizes a pendulum which rotates only or oscillates and slowly rotates, in order to determine the gravity, any variation in uniformity thereof at the location of the meter and the direction from which come any increased amount of gravitational force. The gravity meter is useful for measuring or indicating gravitational forces and their variation such as occur by the presence of salt domes. The meter has usefulness therefore in oil prospecting.

It is an object of the invention to construct a gravity meter utilizing a pendulum rotating at a constant speed which causes the pendulum to swing or rotate in a path around its center of suspension so that when gravity forces thereupon are uniform the path of rotation is circular and any unbalance or lack of uniformity in the force of gravity acting upon the pendulum will influence the path of rotation from a circular path, i. e., the amplitude of the deviation of the pendulum from a neutral or center position will change or vary which variation is indicated. Also any increase or decrease in gravitational force although uniform from an established normal will influence the path of rotation in a circle of decreased or increased radius respectively which variation is indicated.

Another object is to construct an oscillating pendulum and to indicate any variation in the path of the oscillation thereof from a neutral or central position and the amount thereof. The oscillating pendulum preferably is rotated slowly through 360 degrees as it oscillates to indicate a point of maximum variation from its normal path of movement and hence the direction of any unbalanced or increased amount of gravitational forces.

Another object of the invention is to measure the variation in the force of gravity at the location of the gravity meter utilizing either a rotating or an oscillating pendulum by introducing a counteracting force against any unbalanced gravitational forces affecting the path of rotation or oscillation of the pendulum to restore the rotating pendulum to its circular path or the oscillating pendulum to its normal path which introduced or counteracting force is a function of or proportional to the amplitude of the unknown gravitational forces causing variation and its position of maximum or minimum permits its direction to be determined or indicated.

A still further object is to construct a gravity meter utilizing an oscillating pendulum which preferably turns slowly as it oscillates and any deviation of the pendulum from its normal path vertical to its suspension is indicated.

Another object in addition to that next preceding including exerting a counteracting force on the pendulum to restore the same to its normal path and indicating the amplitude thereof as well as its maximum value.

Other objects of the invention will be more apparent from the following description when taken in connection with the accompanying drawing illustrating some preferred embodiments of the invention in which:

Figure 1 is a diagrammatic view and partly in perspective of a gravity meter utilizing a rotating pendulum in which the path of movement of the pendulum is indicated on a cathode ray tube.

Figure 2 is a diagrammatic and partial view of a gravity meter utilizing a rotating pendulum having a central mass of known amount which is adjustable laterally, circularly and vertically for counteracting the unbalancing gravitational forces acting upon the pendulum.

Figure 3 is a diagrammatic view of a pendulum gravity meter utilizing a rotating pendulum and having electrical means to restore the pendulum to its normal or circular path of movement, the amount of counterforce provided being determinable.

Figure 4 is a diagrammatic view of a gravity meter utilizing an oscillating pendulum which is slowly rotated and which measures the deviation in the path of movement at center position.

Figure 5 is a diagrammatic view of a gravity meter using an oscillating pendulum which slowly rotates and which indicates the amplitude of the oscillation.

Figure 6 is a diagrammatic view to illustrate the mounting of the coils for rotative movement or adjustment thereof.

The gravity meter may use either a rotating pendulum or an oscillating one and the deviation of which from its respective normal path provides an indication of a non-uniform gravitational field caused by variation in mass of the earth and the amount of deviation provides an indication of the extent of the mass causing non-uniformity in the gravity field. Also by indicating the point of maximum variation, the direction of the unknown mass is indicated.

A gravity meter utilizing a rotating pendulum is shown in Figures 1 to 3 inclusive and includes a motor 10 which carries a hinge 11 to which a pendulum 12 is attached for free swinging movement outwardly from the center or suspension or neutral point. The motor is a constant speed motor and rotates the pendulum so that it swings outwardly by centrifugal force from its center of suspension or neutral point at non-rotating position. Preferably the motor rotates the pendulum at a speed so that its angular position with respect to vertical is 22 degrees although it may differ therefrom over a wide range. For a particular gravitational force of uniform distribution the pendulum will rotate in a circle or follow a circular path and a circular path of particular diameter. For an increased gravitational force or field of uniform distribution the pendulum will rotate in a circle of lesser radius so that the balanced or uniform field is indicated by the circular path of rotation and the increased gravitational force manifests itself by the circular path having a radius less than that for gravity forces of an established value or normal. Again for uniform gravity distribution but of a lesser amount than an established normal, the pendulum will rotate higher or at a greater angle from neutral or vertical and hence the circular path of rotation will have a greater radius than that produced by an established normal gravity force. The gravity meter may be carried upon any suitable frame 13 so that it may be rotated at least through 90 degrees or the coils 17, 18, 19 and 20 may be mounted upon a ring which can be turned through at least 90°.

Means are provided responsive to the path of movement of the pendulum which may be any suitable means that illustrated utilizing a cathode ray tube 15, magnet means and coil means to indicate any deviation from a normal path. Preferably the pendulum carries a magnet 16 and at least one coil is mounted adjacent the path of movement of the magnet. The coil means preferred include a plurality of coils such as four coils 17, 18, 19 and 20 uniformly placed around the path of movement of the magnet so that as the magnet passes each coil an electromotive force is generated in each coil. The coils preferably have pole pieces 21 and the magnet 16 and the coils are essentially a generator. The coils 17 and 18 on opposite sides from each other are connected with one pair of deflecting plates 20 and 21 of the cathode ray tube and the coils 19 and 20 are connected with the other pair of deflecting plates of the cathode ray tube. The beam of the cathode ray tube traces a uniform figure upon its screen when the gravity forces acting upon the pendulum are uniform in all directions. The figure is a four pointed one with definite peaks and a deep valley between although the form of the figure is unimportant since it is the amplitude of the peaks which indicate variation in the gravitational field. The strength of the gravity forces can be determined by comparison of the amplitude of the peaks showing on the screen of the cathode ray tube with that produced by a known gravitational force.

If now an unknown mass M as shown in Figure 3 exists in the vicinity or range of the gravity meter, the gravitational force upon the pendulum will have no or little effect thereupon in the rotation of the pendulum on the right hand side of its rotation or the side of the mass because the gravitational forces on this side are or practically are in alignment with the pendulum suspension rod. However, when the pendulum is on the left hand side, it will be attracted towards this unknown mass and rotate at a lesser angle or a smaller radius from the center line of suspension on this side of its path of rotation as compared to the path followed or angular displacement when the gravitational forces are uniform as indicated by the line 25. The pendulum therefore will not rotate in a circle and the deviation from a normal circular path of rotation will remove the magnet 16 somewhat, or increase its distance, from the coil at this position with the result that the electromotive force generated in the coil is less and the trace on the cathode ray tube at this position will deviate or have a lower peak as compared with the peak of a uniform gravitational field and the amount of such deviation is a function of or proportional to the unknown mass. By turning the gravity meter, the location of the maximum deviation in the peak shown on the scope indicates also the direction of the unknown mass, that is it is opposite to the point of maximum deviation as is illustrated in Figure 3. Of course the scope may be connected so that the maximum deviation appears on the side of the scope having maximum gravitational force or the unknown mass affecting the pendulum.

The gravity meter may include means to introduce a force to counteract any unbalanced gravitational forces affecting the path of rotation of the pendulum to restore the path of movement of the pendulum to a normal path and hence a figure of uniform peaks on the scope. Such restoring or counteracting means will be adjustable as to amount of counteracting force applied and as to its position and may take several forms two of which are illustrated in Figures 2 and 3. When the counteracting force is so located and of such amount as to restore a circular path of rotation to the pendulum as indicated by the peaks of the figure on the screen of the cathode ray tube all being equal, the amount of unbalance or counteracting force introduced into the pendulum is a measure of or proportional to the unknown mass and the location of the maximum counteracting force provides an accurate indication of the direction of the unknown mass affecting the pendulum.

In Figure 2 the gravity meter 12 may have a central post 30 upon which is mounted a weight 31. The weight has a slot 32 therein so that it may be moved or its position adjusted laterally to introduce the counteracting gravitational force of the weight upon the pendulum. The weight 31 also may be adjusted circularly so that the counteracting gravitational force of the weight may be positioned in the proper position circularly to counteract the unknown gravitational force acting upon the pendulum. The weight may also be moved vertically. With the mass of the weight 31 being known and the amount of its lateral displacement being measured or indicated by a pointer and the direction of its lateral displacement being known, or visually ascertained, the size of the unknown mass can be determined or compared with a known external mass as well as its direction.

Figure 3 shows another and an electrical form of means for introducing a counteracting force acting upon the pendulum in order to restore the path of rotation of the pendulum to a circular path and therefore restore the trace or pattern on the screen of the cathode ray tube to one having uniform amplitude of peaks. In this form a coil 35 is provided adjacent to the pendulum mass and is mounted to be moved circularly around the path of movement of the pendulum weight. The coil is moved around the path of movement of the pendulum 12 until the coil is located at the point of maximum deviation from circular in the rotation of the pendulum as shown on the screen of the cathode ray tube. The current through the coil is then varied until the path of movement of the pendulum as shown on the cathode ray tube screen is restored to circular or the scope figure has uniform peaks.

A meter 36 measures the current through the coil which is proportional to the unknown mass and the location of the coil when complete counteraction is secured provides an indication of the direction of the unknown mass that is in the direction opposite from the point of maximum deviation or point of application of the counteracting force sufficient to restore the path of rotation of the pendulum to circular. The electromagnet or coil 35 is shown as being outside of the path of rotation of the pendulum; however, it may be inside of the path of rotation and exert a repulsive force on the pendulum. Irrespective of the location of the counteracting means or force, it may be a repulsive force or an attracting force but whichever it is, it must be known since, if a repulsive force is used for an externally located counteracting force as shown in Figure 3, then the force applied is strictly not a counteracting force but is on the other hand a force which balances the unbalancing force of the unknown mass and the direction of the unknown mass, is not on the other side of the pendulum as with an attracting counteracting force but, is on the same side. The reverse relationship exists when the counteracting means is located within the path of movement of the pendulum.

A gravity meter having an oscillating pendulum is shown in Figures 4, and 5, that of Figure 4 indicating the deviation in the swing of the pendulum at central or middle position of the pendulum's oscillation and that in Figure 5 indicating any change in the amplitude of the oscillation of the pendulum at the end of its oscillation.

In Figure 4 the pendulum 40 oscillates on a pivot 41 carried by a shaft 42 driven by a motor 43, the pivot permitting sufficient lateral displacement of the pendulum with respect to its plane of oscillation under unbalanced gravitational forces acting upon the pendulum. The pendulum is oscillated through an escapement drive mechanism 44 of any form, many of which are available. As the pendulum oscillates it is slowly rotated by the motor 43 so that the pendulum swings through 360° in about one minute's time. Carried by the motor shaft 42 is a bracket 46 carrying platforms 47 and 45. The pendulum oscillates between the two platforms and as the pendulum is gradually rotated, the platforms rotate therewith.

Upon the platform 47 is mounted an indicating mechanism including a coil 48 adjacent to the path of movement of a magnet 16, shown as carried by the pendulum rod when the pendulum is in vertical position or at the midpoint of its oscillation. The pendulum normally oscillates in a vertical plane through its suspension when the gravitational forces are uniform. If, however, there is a mass on one side of the pendulum, the pendulum is attracted thereby and deviates slightly from its vertical plane of oscillation which brings its closer to the coil 48 increasing the E. M. F. generated in the coil and thereby increasing the height or amplitude of the peak shown on the screen of the cathode ray tube 49. A maximum amplitude will be shown when the unknown mass is at right angles to the plane of oscillation of the pendulum and upon the side of the coil 48 so that the position of the coil when the scope 49 shows a maximum peak of the beam trace thereon it is known that the center of the mass M is in that direction. By a like token, minimum peak is shown when the gravity meter has rotated through 180° which can be used as a check of the maximum peak or may be used independently as pointing the direction of the unknown mass.

The gravity meter may have means to apply a counteracting force to restore the pendulum to its normal path of movement. The means shown in Figure 4 is an electrical means including a second coil 52 on a platform 45 on the opposite side of the pendulum from the coil 48. The circuit of the coil will include a rheostat 53 and an ammeter 54. The current through the coil 52 is varied by the rheostat until the scope 49 indicates that the counteracting force exerted by the coil 52 has restored the pendulum to its normal path of oscillation as indicated by a normal peak in the beam trace on the scope. The current indicated by the ammeter 54 is proportional to or a measure of the bulk of the unknown mass. The position of the platform when maximum current is required to restore the pendulum to its normal path of oscillation indicates the direction of the mass. It is clear that a mass of known amount can be substituted for the coil and adjustable as to its position adjacent to the pendulum to provide a counteracting force to restore the pendulum to its normal path of movement. The position of the mass when the path of the pendulum is restored to normal provides a measure of the unknown mass in the amount of displacement of the known mass.

The oscillating pendulum pravity meter illustrated in Figure 5 is like that of Figure 4 excepting that it measures or indicates the amplitude of the oscillation of the pendulum. This pendulum is also rotated slowly or about one revolution per minute so that gravitational forces through 360° may be indicated. Since there is relatively slight motion at the peak of the oscillation of the pendulum, electrical means for indicating variation in the amplitude of oscillation is not very effective. It is for this reason that a photo electric means is utilized to indicate any variation in the amplitude of the oscillation. The photoelectric means includes a lamp 60 which provides a beam of light such as through a screen 61 which beam of light is adjusted so that it is just completely blocked out by the pendulum 40 at the upper end of its oscillation, i. e. the edge of the beam and the edge of the beam block coincide. A separate target 62 carried by the pendulum rod is also suitable as a beam block. A photo tube 63 is located on the other side of the pendulum or beam block which intercepts the light beam. The current through the photo tube is amplified in the amplifier 64 and the extent of interception is indicated on the screen of the cathode ray tube 49. The photoelectric means may be mounted on a table 65 which is attached to the shaft 42 of the motor so that the photoelectric means rotates as the pendulum 40 is rotated.

So long as the pendulum swings its normal amplitude the entire light beam is cut off at the top of its swing and the scope beam trace has a maximum peak.

If an unknown mass M should be present it would effect the amplitude of the oscillation so that the pendulum 40 will not swing as high and only a portion of the light beam will be intercepted thereby. When the light beam is completely intercepted a peak of maximum amplitude will appear on the screen of the scope. If all of the light beam was not intercepted, then the peak or amplitude of the trace appearing on the screen will not be as great and the amplitude or amount of deviation between a peak of maximum amplitude and one of lesser amplitude is a measure of the mulk of the unknown mass effecting the oscillation of the pendulum.

As the pendulum rotates around 360° there will be a position where the deviation is a maximum and in this position the pendulum is swinging in a plane in the direction of the unknown mass so that its location is indicated.

The gravity meter of Figure 5 may also have means to restore the pendulum to its normal amplitude of oscillation. This means may be mounted on the platform 65 and may be electrical or mass means, there being shown particularly an electrical means including a coil 70 which provides a counteracting force, an ammeter 71 and a source of direct current. The ammeter reading of the current necessary to restore the pendulum to its normal peak of travel is proportional to the unknown gravitational force acting on the pendulum. The scope shows when the normal amplitude has been restored to the pendulum. The counteracting force or coil may be applied at either end of the swing of the pendulum.

The pendulum of all of the gravity meters illustrated may be adjustable as to weight as indicated in the pendulum 40 of Figure 4 in which thin washers 55 may be added to or removed from the pendulum. Similarly the length of arm of the pendulum or weight may be varied by means of a nut 56. All pendulums may be adjusted as to mass and length of arm by this or any other suitable adjusting means.

It will be noted that the gravity meters described have two different types of movement, that of Figures 1 to 3 inclusive being a circular path and that of Figures 4 and 5 being an oscillatory path. For the rotating pendulum a normal path of movement is circular of determined or set radius, and for the oscillating pendulum, it is in a vertical plane or the plane of a uniform gravitational field. The gravity meter should be leveled before it is used or set into operation.

The invention is presented to fill a need for improvements in a gravity meter. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gravity meter comprising a frame, a pendulum having a mounting permitting freedom to deviate in its movement, means to continuously move the pendulum from its suspended position in a predetermined path of movement under normal conditions and each repetition of movement constituting a cycle, pulse generating means carried by the pendulum and the frame and generating by the movement of the pendulum at least one electrical pulse for each cycle of movement of the pendulum, the amplitude of the pulse being responsive to a deviation in the path of movement of the pendulum from a normal path of movement because of a change in gravity, an indicator operated by the electrical pulse generating means to indicate the extent of deviation, means to apply a counteracting force upon the pendulum to restore it to its normal path of movement, and means to indicate the amount of counteracting force applied.

2. A gravity meter as in claim 1 in which the means to apply a counteracting force is an electrical means, and the indicating means is an ammeter.

3. A gravity meter comprising a frame, a pendulum having a mounting permitting freedom to deviate in its movement, means to continuously move the pendulum from its suspended position in a predetermined path of movement under normal conditions and each repetition of movement constituting a cycle, pulse generating means carried by the pendulum and the frame and generating by the movement of the pendulum at least one electrical pulse for each cycle of movement of the pendulum, the amplitude of the pulse being responsive to the deviation in the path of movement of the pendulum from a normal path of movement because of a change in gravity, an indicator operated by the electrical pulse generating means to indicate the extent of deviation, the pulse generating means including coil means and magnetic means, one of said means being carried by the pendulum and the other means being mounted adjacent to the path of movement of the former, and means indicating the electromotive force in the coil means.

4. A gravity meter as in claim 3 in which the magnetic means is carried by the pendulum and the coil means including at least one coil is mounted adjacent the path of movement of the magnetic means.

5. A gravity meter as in claim 3 in which the magnetic means is carried by the pendulum and the coil means is a plurality of coils mounted adjacent to the path of movement of the magnetic means and spaced a uniform distance apart.

6. A gravity meter comprising a frame, a pendulum, means to rotate the pendulum in a normal circular path at a constant speed, pulse generating menas carried by the pendulum and the frame and generating by the movement of the pendulum at least one electrical pulse for each cycle of movement of the pendulum, the amplitude of the pulse being responsive to a deviation in the path of of movement of the pendulum from a normal path of movement because of a change in gravity, an indicator connected with the pulse generating means to indicate a deviation from the normal circular path of movement of the pendulum, the pulse generating means including a magnetic means and a coil means one of which means is carried by the pendulum and the other of which means is mounted adjacent to the path of movement of the first means, and the indicator being an electrical device responsive to the electromotive force generated in the coil means.

7. A gravity meter comprising a frame, a pendulum, means to rotate the pendulum in a normal circular path at a constant speed, pulse generating means carried by the pendulum and the frame and generating by the movement of the pendulum at least one electrical pulse for each cycle of movement of the pendulum, the amplitude of the pulse being responsive to a deviation in the path of movement of the pendulum from a normal path of movement because of a change in gravity, an indicator connected with the pulse generating means to indicate a deviation from a normal circular path of movement of the pendulum, the pulse generating means including magnetic means and coil means, one of the means being carried by the pendulum and movable therewith and the other including a plurality of parts spaced around and adjacent the path of movement of the first means, and the indicator being an electrical device responsive to the electromotive force generated in the coil means.

8. A gravity meter as in claim 7 in which the magnetic means is carried by the pendulum, and the coil means are a plurality of coils uniformly spaced around and adjacent the path of movement of the magnetic means.

9. A gravity meter comprising a frame, a pendulum, means to rotate the pendulum in a normal circular path at a constant speed, pulse generating means carried by the pendulum and the frame and generating by the movement of the pendulum at least one electrical pulse for each cycle of movement of the pendulum, the amplitude of the pulse being responsive to a deviation in the path of movement of the pendulum from a normal path of movement because of a change in gravity, an indicator connected with the pulse generating means to indicate a deviation from the normal circular path of movement of the pendulum, the pulse generating means adjustable with respect to the pendulum to counteract unbalanced earth forces acting upon the pendulum and restore the same to a circular path of rotation.

10. A gravity meter as in claim 9 in which the counteracting means includes a counteracting coil, mounting means for securing the coil adjacent the path of movement of the pendulum and adjustable around its path of movement, a source of current for the counteracting coil, and an ammeter connected in circuit with the counteracting coil to measure the current therethrough.

References Cited in the file of this patent

UNITED STATES PATENTS

| | | |
|---|---|---|
| 1,787,536 | Hayes | Jan. 6, 1931 |
| 1,951,226 | Wold | Mar. 13, 1934 |
| 2,319,940 | Morrison | May 25, 1943 |
| 2,353,150 | Dietz | July 11, 1944 |

FOREIGN PATENTS

| | | |
|---|---|---|
| 514,847 | Germany | Dec. 20, 1930 |
| 3353/31 | Australia | Aug. 4, 1931 |